United States Patent
Merriman

(10) Patent No.: US 11,248,467 B2
(45) Date of Patent: Feb. 15, 2022

(54) FAN BLADE

(71) Applicant: ROLLS-ROYCE plc, London (GB)

(72) Inventor: Nicholas M Merriman, Derby (GB)

(73) Assignee: ROLLS-ROYCE PLC, London (GB)

( * ) Notice: Subject to any disclaimer, the term of this patent is extended or adjusted under 35 U.S.C. 154(b) by 148 days.

(21) Appl. No.: 16/743,601

(22) Filed: Jan. 15, 2020

(65) Prior Publication Data

US 2020/0240272 A1   Jul. 30, 2020

(30) Foreign Application Priority Data

Jan. 24, 2019 (GB) ..................................... 1900961

(51) Int. Cl.
*F01D 5/14* (2006.01)

(52) U.S. Cl.
CPC ............. *F01D 5/143* (2013.01); *F01D 5/147* (2013.01); *F05D 2240/307* (2013.01)

(58) Field of Classification Search
CPC . F01D 5/143; F01D 5/147; F01D 5/20; F05D 2240/307; F04D 29/384
See application file for complete search history.

(56) References Cited

U.S. PATENT DOCUMENTS

| | | | | |
|---|---|---|---|---|
| 9,506,350 | B1* | 11/2016 | Memmen | F01D 5/28 |
| 10,747,912 | B2* | 8/2020 | Olive | F01D 5/147 |
| 2005/0232771 | A1* | 10/2005 | Harvey | F01D 5/20 |
| | | | | 416/97 R |
| 2008/0159869 | A1 | 7/2008 | Ruehr et al. | |
| 2010/0329863 | A1 | 12/2010 | Kray et al. | |
| 2016/0362987 | A1 | 12/2016 | Hansen et al. | |
| 2017/0226871 | A1* | 8/2017 | Auzillon | F01D 5/20 |
| 2018/0087387 | A1* | 3/2018 | Shi | F01D 5/288 |
| 2018/0202295 | A1* | 7/2018 | Rhodes | F01D 5/20 |
| 2018/0245469 | A1* | 8/2018 | Bloxham | F01D 5/284 |
| 2018/0298763 | A1* | 10/2018 | Lee | F01D 5/187 |
| 2018/0320525 | A1* | 11/2018 | Clum | F01D 5/147 |
| 2019/0338650 | A1* | 11/2019 | Henderkott | F01D 5/187 |
| 2020/0182062 | A1* | 6/2020 | Gemeinhardt | F04D 29/324 |

FOREIGN PATENT DOCUMENTS

| | | |
|---|---|---|
| EP | 2952685 A1 | 12/2015 |
| GB | 2543327 A | 4/2017 |
| WO | WO2011002570 A1 | 1/2011 |
| WO | WO2011038971 A1 | 4/2011 |

OTHER PUBLICATIONS

Search Report of the Intellectual Property Office of the United Kingdom for GB1900961.2 with search date of Jul. 15, 2019.
May 29, 2020 extended Search Report issued in European Patent Application No. 19219322.5.

* cited by examiner

*Primary Examiner* — Aaron R Eastman
(74) *Attorney, Agent, or Firm* — Oliff PLC

(57) ABSTRACT

A fan blade comprising a tip surface configured in use to face an internal wall of a nacelle. The tip surface having a suction side edge, a pressure side edge and a chamfer such that in use the suction side edge is further than the pressure side edge from the internal wall of the nacelle. The chamfer angle of the chamfer varies along the tip surface between a leading edge of the fan blade and a trailing edge of the fan blade.

13 Claims, 5 Drawing Sheets

FAN BLADE

CROSS-REFERENCE TO RELATED APPLICATIONS

This specification is based upon and claims the benefit of priority from United Kingdom patent application number GB 1900961.2 filed on Jan. 24, 2019, the entire contents of which are incorporated herein by reference.

BACKGROUND

Field of the Disclosure

The present disclosure relates to a fan blade, a fan and an aircraft engine.

Description of the Related Art

An aircraft engine such as a gas turbine engine has a fan that rotates. During rotation of the fan, the tips of the fan blades come close to, and sometimes contact, the internal wall of the surrounding nacelle. Contact between the tips of the fan blades and the internal wall can damage the fan blades, thereby reducing the durability and/or lifetime of the fan blades.

On the other hand, undesirably large gaps between the tips of the fan blades and the internal wall can reduce the efficiency and operability of the fan. Furthermore, such gaps can undesirably increase noise levels produced by the engine.

It is an aim of the present disclosure to provide a fan blade and/or a tip cap with an improved durability that outweighs any reduction in efficiency or operability or any increase in noise levels.

SUMMARY OF THE DISCLOSURE

According to a first aspect there is provided a fan blade comprising a tip surface configured in use to face an internal wall of a nacelle, the tip surface having a suction side edge, a pressure side edge and a chamfer, having a chamfer angle, such that in use the suction side edge is further than the pressure side edge from the internal wall of the nacelle, wherein the angle of the chamfer varies along the tip surface between a leading edge of the fan blade and a trailing edge of the fan blade.

According to a second aspect there is provided a tip cap for a fan blade, the tip cap comprising a tip surface configured in use to face an internal wall of a nacelle, the tip surface having a suction side edge, a pressure side edge and a chamfer, having a chamfer angle, such that in use the suction side edge is further than the pressure side edge from the internal wall of the nacelle, wherein the angle of the chamfer varies along the tip surface between a leading edge of the fan blade and a trailing edge of the fan blade.

According to a third aspect there is provided a fan blade comprising the tip cap.

In an arrangement, the rate of change of the chamfer angle with respect to chord position is greater in regions where the curvature of the perimeter of the tip surface is greater. In an arrangement, the rate of change of the chamfer angle with respect to chord position is greater at the trailing edge and/or at the leading edge than at a middle portion between the trailing edge and the leading edge.

In an arrangement, the fan blade comprises a main body formed of a first material and at least one outer layer formed of a second material different from the first material, wherein the at least one outer layer is applied on at least the suction side of the fan blade. In an arrangement, the first material is a carbon fiber reinforced polymer. In an arrangement, the second material is a metal.

In an arrangement, the fan blade comprises a main body formed of metal. In an arrangement, the tip surface is curved in a plane perpendicular to the engine axis (O) around which the fan blade rotates in use, such that in use a point of the tip surface nearer to the pressure side edge than the suction side edge and spaced from the pressure side edge is equally close as the pressure side edge to the internal wall of the nacelle.

In an arrangement, the fan blade or tip cap comprises an abrasive powder applied to the tip surface in the region of the pressure side edge.

In an arrangement, the tip surface comprises a groove extending longitudinally along the length of the chord between the leading edge and the trailing edge.

In an arrangement, the chamfer angle is at most 10°, and optionally at most 5°. In an arrangement, the chamfer angle is between the tip surface and a tangent perpendicular to the radial direction, wherein the radial direction is from the engine axis around which the fan blade rotates in use to the tip surface, wherein the chamfer angle is in a plane perpendicular to the engine axis.

According to a fourth aspect there is provided a fan for a gas turbine engine, the fan comprising a plurality of the fan blade.

According to a fifth aspect there is provided a gas turbine engine for an aircraft comprising the fan.

In an arrangement, the gas turbine engine comprises: an engine core comprising a turbine, a compressor, and a core shaft connecting the turbine to the compressor; and a gearbox that receives an input from the core shaft and outputs drive to the fan so as to drive the fan at a lower rotational speed than the core shaft; wherein the fan is located upstream of the engine core.

In an arrangement, the turbine is a first turbine, the compressor is a first compressor, and the core shaft is a first core shaft; the engine core further comprises a second turbine, a second compressor, and a second core shaft connecting the second turbine to the second compressor; and the second turbine, second compressor, and second core shaft are arranged to rotate at a higher rotational speed than the first core shaft.

According to a sixth aspect there is provided an apparatus comprising: the gas turbine engine; and a nacelle surrounding the gas turbine engine, wherein the nacelle has an internal wall comprising an attrition liner surrounding the fan such that the pressure side edges of the tip surfaces of the fan blades cut into the attrition liner.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox is a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. A higher gear ratio may be more suited to "planetary" style gearbox. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 230 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds). The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $\text{Nkg}^{-1}$ s, 105 $\text{Nkg}^{-1}$ s, 100 $\text{Nkg}^{-1}$ s, 95 $\text{Nkg}^{-1}$ s, 90 $\text{Nkg}^{-1}$ s, 85 $\text{Nkg}^{-1}$ s or 80 $\text{Nkg}^{-1}$ s. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400 K, 1450 K, 1500 K, 1550 K, 1600 K or 1650 K. The TET at cruise may be in an inclusive range bounded by any two of the values in the previous sentence (i.e. the values may form upper or lower bounds). The maximum TET in use of the engine may be, for example, at least (or on the order of) any of the following: 1700 K, 1750 K, 1800 K, 1850 K, 1900 K, 1950 K or 2000 K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Aspects and embodiments of the present disclosure will now be discussed with reference to the accompanying figures. Further aspects and embodiments will be apparent to those skilled in the art.

Figure 1:
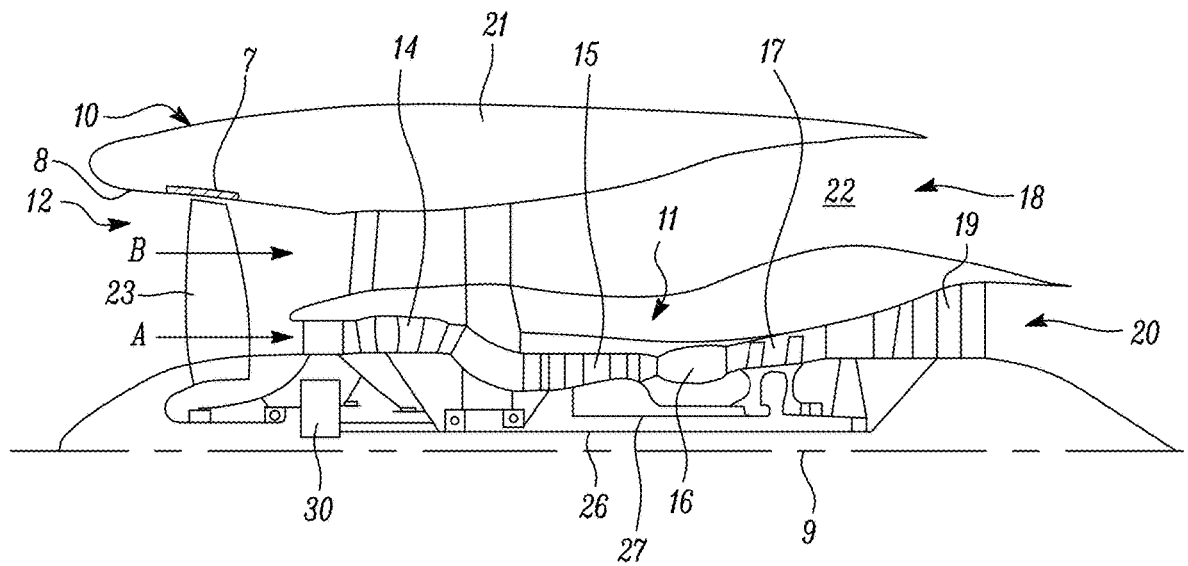
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
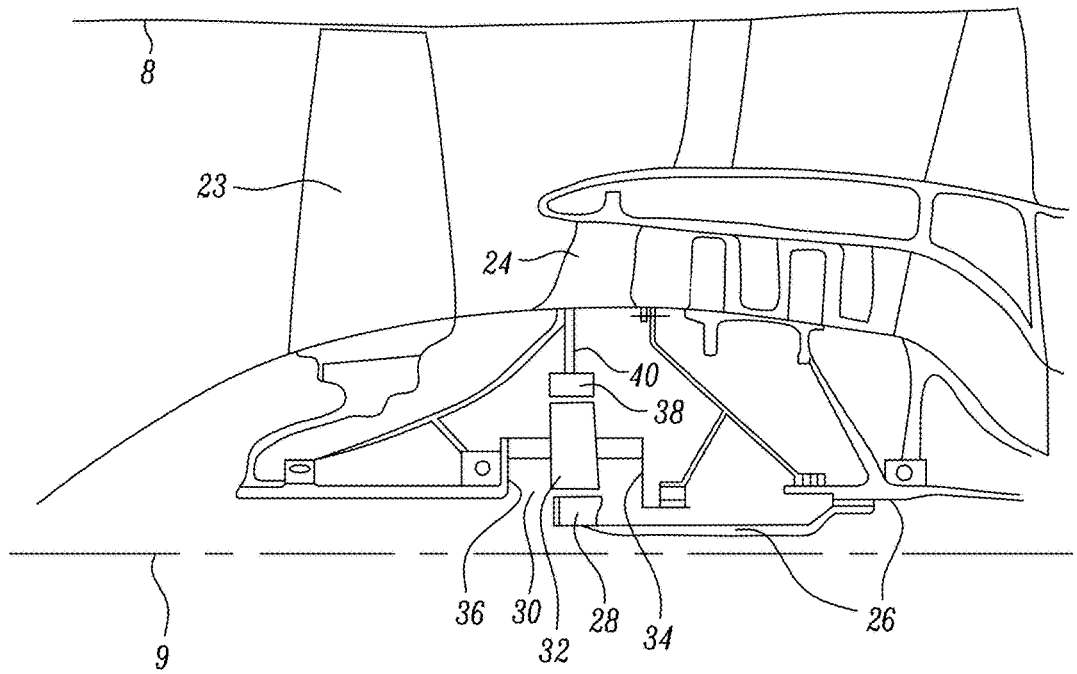
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
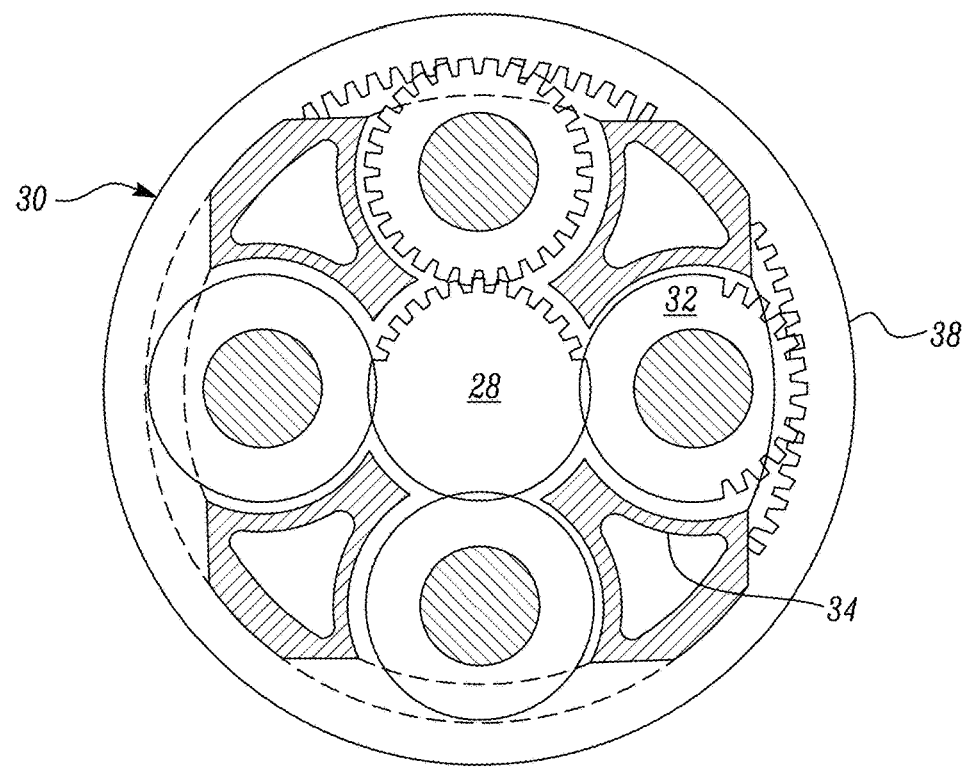
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

The fan 23 comprises a plurality of fan blades 41. The fan blades 41 are attached to a fan disc that functions as the hub of the bladed disc. When the fan 23 rotates, the tips of the fan blades 41 move close to the inner wall 8 of the nacelle 21. During use, the tips of the fan blades 41 may sometimes come into contact with the internal wall 8 of the nacelle 21. This can damage the fan blades 41.

As shown in FIG. 1, the internal wall 8 of the nacelle 21 may comprise an attrition liner 7. The attrition liner 7 is formed of a material that is robust to being contacted by the fan blades 41. The attrition liner 7 can protect the rest of the nacelle 21.

Figure 4:
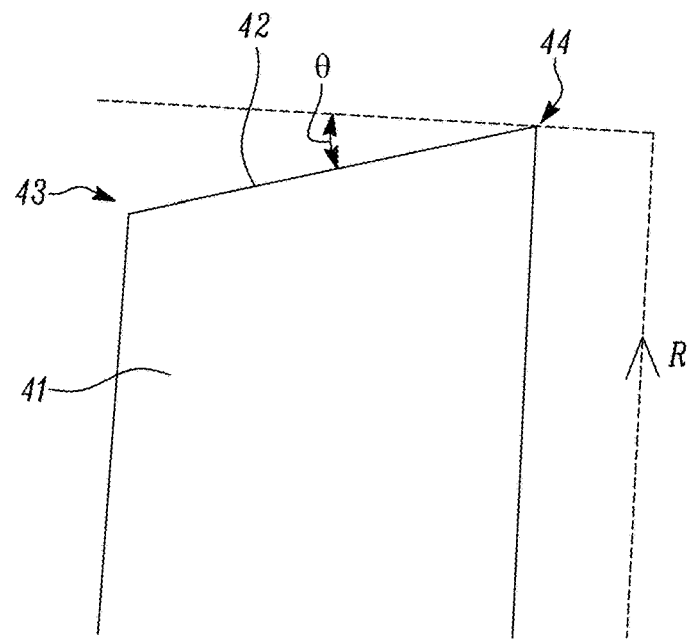
FIG. 4 is a mid-chord sectional view of a fan blade according to the present disclosure.

FIG. 4 is a mid-chord sectional view of a fan blade 41 according to the present disclosure. The fan blade 41 comprises a tip surface 42. The tip surface 42 is configured to face the internal wall 8 of the nacelle 21. As shown in FIG. 4, the tip surface 42 has a suction side edge 43 and a pressure side edge 44. The suction side edge 43 is the edge of the tip surface 42 on the suction side of the fan blade 41. The pressure side edge 44 is the edge of the tip surface 42 on the pressure side of the fan blade 41. During use, the fan blade 41 rotates towards the pressure side of the fan blade 41 (i.e. from left to right in FIG. 4).

As shown in FIG. 4, in an arrangement the tip surface 42 has a chamfer such that in use the suction side edge 43 is further than the pressure side edge 44 from the internal wall 8 of the nacelle 21. In FIG. 4, the chamfer is shown by the fact that the tip surface 42 forms a line other than a horizontal line. For example, the tip surface 42 may form a diagonal line or a curved line. It is not necessary for the line to be straight. The dashed horizontal line represents the plane perpendicular to the radial direction R. The radial direction R is the direction from the engine axis O to the tip surface 42. The radial direction R is perpendicular to the engine axis O.

In the section shown in FIG. 4, the chamfer has a chamfer angle θ as shown. By providing the chamfer, the suction side edge 43 is less likely to contact the internal wall 8. This reduces the possibility of the fan blade 41 being damaged. In particular, as will be explained in more detail with reference to FIGS. 7 and 8, the suction side edge 43 may comprise one or more layers 81, 82. If the suction side edge 43 comes into contact with the internal wall 8 during rotation of the fan 23, then there is a chance that one or more of these layers 81, 82 may peel away from the rest of the fan blade 41. This damages the fan blade 41, reducing its lifetime. Such damage also undesirably affects the efficiency, operability and noise levels of the gas turbine engine 10. By providing the chamfer, the possibility of such layers 81, 82 peeling away from the fan blade 41 is reduced.

The pressure side edge 44 of the tip surface 42 may sometimes come into contact with the internal wall 8. When the pressure side edge 44 contacts the internal wall 8, it tends to cut into the internal wall 8 (or the attrition liner 7 of the internal wall 8). The contact causes any layers 81, 82 to be compressed against the rest of the fan blade 41. When the pressure side edge 44 rubs against the attrition liner 7, the layers 81, 82 do not peel away from the rest of the fan blade 41.

As the fan blade 41 grows under centrifugal and thermal loads, the attitude of the tip plane changes. The attitude of the tip plane also varies along the chord for any given flight condition. In addition, the tip plane attitude dynamically varies dependent on the dynamic response of the whole of the fan blade 41. As a result, when the tip of the fan blade 41 rubs the attrition layer 7, the nature of the cut/rub depends on whether the pressure side edge 44 or the suction side edge 43 (or both equally) comes into contact with the attrition layer 7. The nature of the rub/cut determines the extent and level of local heating and damage to the tip of the fan blade 41.

Figure 5:
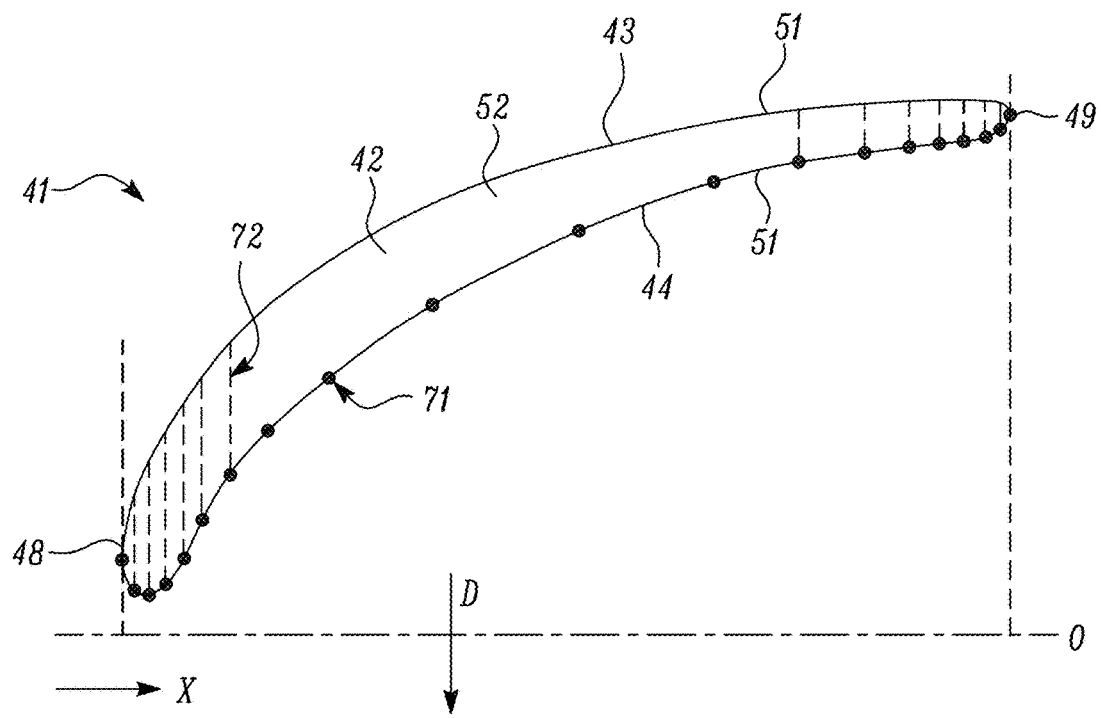
FIG. 5 is a top view of a fan blade according to the present disclosure.

FIG. 5 is a top view of a fan blade 41 according to the present disclosure. The view shown in FIG. 5 is a view if looking down on the fan blade 41 shown in FIG. 4 from the top. As shown in FIG. 5, the fan blade 41 comprises a leading edge 48 and a trailing edge 49. The vertical dashed lines shown in FIG. 5 represent the leading edge tangent and the trailing edge tangent of the perimeter 51 of the tip surface 42. The perimeter 51 comprises the suction side edge 43 and the pressure side edge 44. The perimeter 51 comprises the leading edge 48 and the trailing edge 49.

FIG. 5 shows the engine axis O around which the fan blade 41 rotates in use. FIG. 5 shows the direction D in which the fan blade 41 travels. FIG. 5 shows the chord position X. The chord position X is a coordinate along the engine axis O from the leading edge 48 to the trailing edge 49.

In an arrangement, the chamfer angle θ of the chamfer varies along the tip surface 42 between the leading edge 48 and the trailing edge 49. The chamfer angle θ is different for different chord positions X. FIG. 5 shows edge points 71, each edge point 71 corresponding to a different chord position X. The chamfer angle θ may vary from each edge point 71 to the next. Variation of the chamfer angle θ with chord position X allows the chamfer angle θ to be kept at a minimum for each position, while still having the advantage of the suction side edge 43 not coming into contact with the attrition liner 7.

The greater the chamfer angle θ, the greater the potential gap between the suction side edge 43 and the internal wall 8 of the nacelle 21. Such a gap can undesirably affect the operability of the fan blade 41 and the aerodynamic efficiency of the tip of the fan blade 41. It is desirable to keep the chamfer angle θ to a minimum.

According to the present disclosure, a chamfer like form is introduced to the fan tip plane (i.e. the tip surface 42) that is contoured in two dimensions such that despite the inherent dynamic and steady changes in tip position during service running, the tip itself is afforded improved durability during rubbing with the attrition liner 7 (also called the casing liner) whilst having minimal effect on fan tip efficiency, operability and noise levels.

The values for the chamfer angle θ at different chord positions X can be chosen depending on the type of fan blade 41 and the operating conditions of the fan blade 41. The attitude of the tip plane during steady state running and dynamic response can be assessed throughout all flight conditions. The tip plane can change shape during acceleration or deceleration, for example when the gas turbine engine 10 is getting up to speed. As a result, the minimum chamfer angle θ required to ensure that the pressure side edge 44 is the only contact point with the attrition liner 7 varies depending on the chord position X. The attitude of the tip plane can be assessed using stress and aeromechanical modelling. The optimum chamfer angle θ as a function of chord position X can be chosen to ensure that only the pressure surface edge 44 at the tip surface 42 touches the attrition liner 7, whilst the suction side edge 43 is kept away.

The present disclosure is expected to reduce occurrences of the suction side edge 43 contacting the attrition liner 7, while allowing the pressure side edge 44 to be a contact point with the attrition liner 7. This helps to ensure that the tip of the fan blade 41 will tend to cut the attrition liner 7 rather than rub it. This helps to reduce the temperature of the fan blade 41 during use.

FIG. 5 shows 20 edge points 71 distributed along the tip surface 42. The number of different edge points 71 (corresponding to differences in chamfer angle θ) is not particularly limited. In an arrangement, the chamfer angle θ varies gradually with respect to chord position X. For example, the chamfer angle θ may change continuously from one edge point 71 to the next edge point 71. Alternatively, the chamfer angle θ may have discontinuities along the chord position X. For example, each edge point 71 may correspond to a particular chamfer angle θ, with the chamfer angle θ suddenly changing to a different chamfer angle θ for the next edge point 71. Some of the (non-adjacent) edge points 71 may correspond to the same chamfer angle θ, although adjacent edge points 71 correspond to different chamfer angles θ.

FIG. 5 shows a tip surface line 72. There is a tip surface line 72 that corresponds to each edge point 71. The section shown in FIG. 4 is a section taken along such a tip surface line 72. The chamfer angle θ is between the tip surface 42 and a tangent perpendicular to the radial direction R. The radial direction R is from the engine axis O around which the fan blade 41 rotates in use to the tip surface 42. The chamfer angle θ is in a plane perpendicular to the engine axis O. The section shown in FIG. 4 is in such a plane perpendicular to the engine axis O.

FIG. 5 shows edge points 71 corresponding to different chamfer angles θ distributed along the tip surface 42. In an arrangement, the chamfer angle θ increases or decreases by a set amount from one edge point 71 to the next adjacent edge point 71. For example, the difference in chamfer angle θ between adjacent edge points 71 may be 0.1° or 0.01°. This means that the distribution of edge points 71 indicates the rate of change of the chamfer angle θ.

As shown in FIG. 5, in an arrangement the rate of change of the chamfer angle θ with respect to chord position X is greater in regions where the curvature of the perimeter 51 of the tip surface 42 is greater. In the example shown in FIG. 5, the curvature of the perimeter 51 is greater in regions closer to the leading edge 48 and the trailing edge 49. A greater curvature means that the curve is tighter, i.e. with a smaller radius of curvature.

As shown in FIG. 5, the edge points 71 are more concentrated in the regions of high curvature. As mentioned above, the attitude of the tip plane changes during steady state running and dynamic response. The amount by which the attitude of the tip plane changes varies according to the chord position X. For positions where the attitude of the tip plane varies to a greater extent, it may be necessary to have a larger chamfer angle θ. Meanwhile, for positions where the attitude does not change so much, a smaller chamfer angle θ may be provided. The amount by which the attitude of the tip plane changes with respect to chord position X is greater in regions of high curvature. Accordingly, by providing that the rate of change of the chamfer angle θ is greater in these regions, the changes in attitude of the tip plane during use can be appropriately compensated for.

In an arrangement, the rate of change of the chamfer angle θ with respect to chord position X is greater at the trailing edge 49 and/or at the leading edge 48 than at a middle portion 52 between the trailing edge 49 and the leading edge 48.

In an arrangement, the chamfer angle θ is greater at the trailing edge 49 and/or at the leading edge 48 than at a middle portion 52 between the trailing edge 49 and the leading edge 48. In an alternative arrangement, the chamfer angle θ is smaller at the trailing edge 49 and/or at the leading edge 48 than at a middle portion 52 between the trailing edge 49 and the leading edge 48.

In an arrangement, the chamfer angle θ is greater at the trailing edge 49 than at the leading edge 48. In an alternative arrangement, the chamfer angle θ is smaller at the trailing edge 49 than at the leading edge 48.

Figure 6:
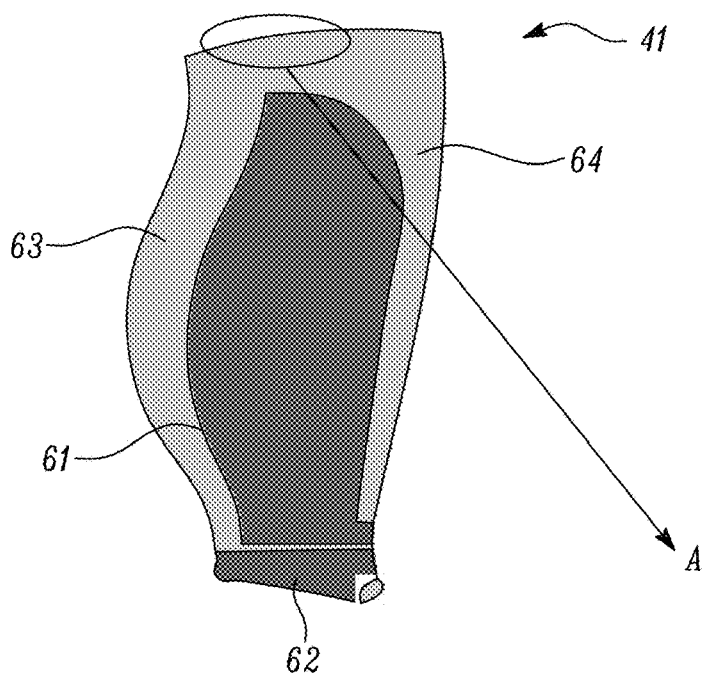
FIG. 6 is a side view of a fan blade according to the present disclosure.

FIG. 6 is a side view of a fan blade 41 according to the present disclosure. As shown in FIG. 6, in an arrangement the fan blade 41 comprises a main body 61. The main body 61 is formed of a first material. For example, the first material may be a carbon fibre reinforced polymer. The first material may be an organic matrix composite. As shown in FIG. 6, in an arrangement the fan blade 41 comprises a blade root 62. The blade root 62 is for connecting to the fan disc of the fan 23.

As shown in FIG. 6, in an arrangement the fan blade 41 comprises a leading edge panel 63 and a trailing edge panel 64. The leading edge panel 63 may be formed of metal work. As shown in FIG. 6, in an arrangement the trailing edge panel 64 has an L-shape, or a hockey stick shape. In FIG. 6, part of the tip of the fan blade 41 is highlighted with an oval and labelled as A.

Figure 7:
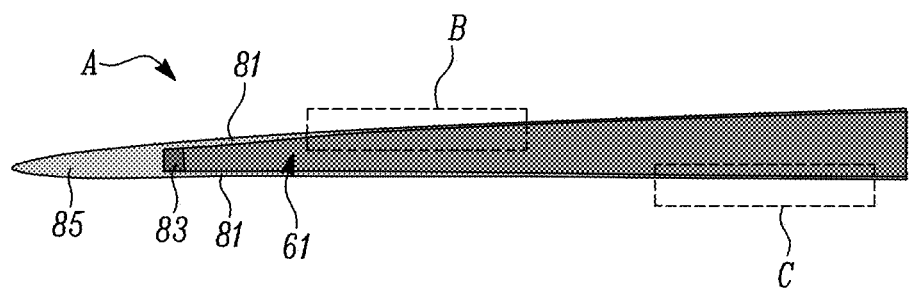
FIGS. 7 to 9 are partial top views of a fan blade according to the present disclosure.

FIG. 7 is a close-up view of part A from FIG. 6. As shown in FIG. 7, in an arrangement the fan blade 41 comprises an outer layer 81. The outer layer 81 is formed of a second material that is different from the first material. For example, the second material may be a metal such as titanium. The outer layer 81 is applied on at least the suction side of the fan blade 41.

As shown in FIG. 7, the outer layer 81 may be applied on both the suction side and the pressure side of the fan blade 41. In particular, FIG. 7 shows that the outer layer 81 forms wings of material on both sides of the fan blade 41. The wings join together at one end of the fan blade 41 to form a bullet-shape 85. The bullet-shape 85 is formed of the same second material as the two outer layers 81 that form wings either side of the main body 61 of the fan blade 41. As shown in FIG. 7, in an arrangement the fan blade 41 comprises a first adhesive 83. The first adhesive 83 is for adhering the bullet-shape 85 and outer layers 81 to the main body 61 of the fan blade 41.

Figure 8:
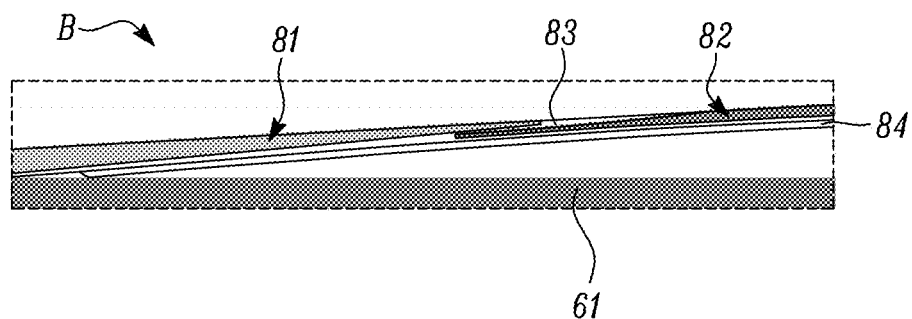

FIG. 7 highlights in rectangles parts B and C of edge portions of the fan blade 41. FIG. 8 shows a close-up of part B on the suction side of the fan blade 41. As shown in FIG. 8, the outer layer 81 shown in FIG. 7 may be a first outer layer. The fan blade 41 may comprise a second outer layer 82. As shown in FIG. 8, the second outer layer 82 may overlap with the first outer layer 81. The second outer layer 82 is formed of a material that is different from the first material (of the main body 61). For example, the material of the second outer layer 82 may be a metal, such as titanium. In an arrangement, the first outer layer 81 and the second outer layer 82 are made of different metals, or different grades of the same metal (e.g. different grades of titanium).

As shown in FIG. 8, in an arrangement a second adhesive 84 is used to help adhere the second outer layer 82 to the main body 61. The first adhesive 83 helps to adhere the first outer layer 81 to the second outer layer 82.

If the suction side edge 43 contacts the attrition liner 7, then one or both of the first outer layer 81 and the second outer layer 82 can be encouraged to peel away from the main body 61. This can happen when the tip of the fan blade 41 rubs against the attrition liner 7. As explained above, the present disclosure reduces the contact between the suction side edge 43 and the attrition liner 7, thereby reducing the possibility of peeling. If the outer layers 81, 82 peel away from the main body 61, then it is possible that the first material of the main body 61 could undesirably come into contact with the attrition liner 7. The present disclosure reduces the possibility of this happening.

Figure 9:
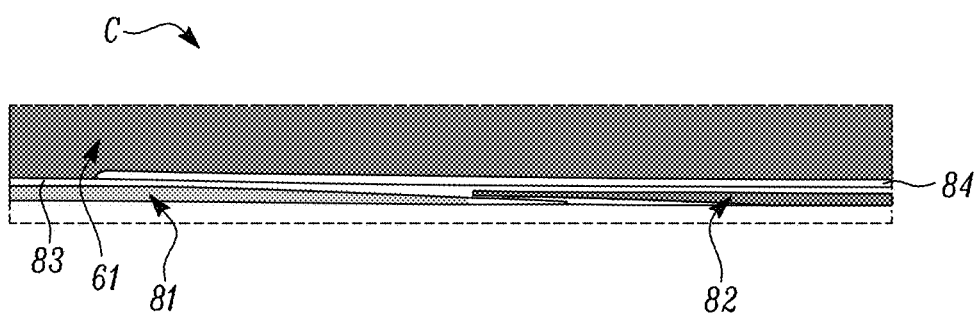

FIG. 9 is a close-up view of part C highlighted in FIG. 7. FIG. 9 shows the first outer layer 81 and the second outer layer 82 on the pressure side of the fan blade 41. As shown in FIG. 9, the first adhesive 83 and the second adhesive 84 (which may be different adhesives) help to connect the outer layers 81, 82 to the main body 61. The present disclosure reduces the possibility of the first material of the main body 61 (which may be a carbon composite material) from rubbing against the attrition liner 7. If the pressure side edge 44 contacts the attrition liner 7, then the pressure surface edge metalwork will cut the attrition liner 7 when the tip rubs. The contact does not result in peeling of the outer layers 81, 82. This is because the force pushes the outer layers 81, 82 against the main body 61, so that there is no peeling force.

As mentioned above, the fan blade 41 may be a composite blade. Alternatively, the fan blade 41 may be a metal blade, such as a titanium blade. In an arrangement, the fan blade 41 comprises a main body 61 formed of metal such as titanium.

Typically, some blades such as composite blades may have the tip plane cut square to the pressure and suction surfaces. According to the present disclosure, instead of having the tip plane cut square, a chamfer is provided so that the angle of the tip plane to the pressure surface is less than 90 degrees and the angle to the suction surface is greater than 90 degrees.

Figure 12:
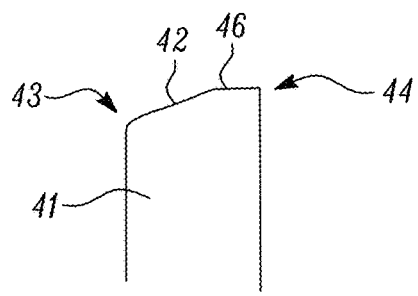

FIG. 12 is a mid-chord sectional view of a fan blade 41 according to the present disclosure. As shown in FIG. 12, the tip surface 42 may not have a sharp angle relative to the suction surface. In an arrangement, the tip surface 42 has a sharp angle relative to the pressure surface so that it cuts (rather than rubs) the attrition liner 7. As shown in FIG. 12, in an arrangement, the tip surface 42 is curved.

In an arrangement, in use the point of the tip surface 42 closest to the internal wall 8 of the nacelle 21 is at the pressure side edge 44 so as to cut (rather than rub) the attrition liner 7. In an arrangement, the tip surface 42 may be curved (in a plane perpendicular to the engine axis O around which the fan blade 41 rotates in use) such that in use the point 46 of the tip surface 42 is equally close to the internal wall 8 of the nacelle 21 as the pressure side edge 44. The chamfer of the tip surface 42 ensures that the point 46 of closest approach to the attrition liner 7 is towards the pressure side edge 44. Meanwhile, the suction side edge 43 is kept further from the attrition liner 7. The curve of the tip surface 42 means that the point 46 of closest approach is equally close to the attrition liner 7 as the pressure side edge 44. Such a curved tip surface 42 may be particular appropriate for a metal blade such as a titanium blade, for example. In contrast, as shown in FIG. 4 the point of closest approach may alternatively be uniquely at the pressure side edge 44.

Figure 11:
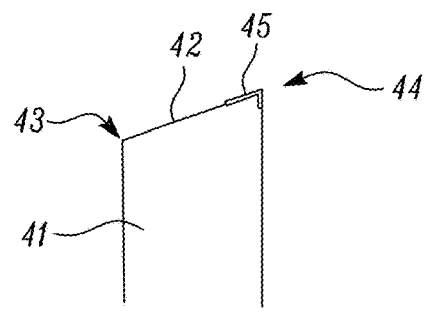

FIG. 11 is a mid-chord section view of a fan blade 41 according to the present disclosure. As shown in FIG. 11, in an arrangement the fan blade 41 comprises an abrasive powder 45. The abrasive powder 45 is applied to the tip surface 42 in the region of the pressure side edge 44. This feature of the abrasive power 45 is compatible with all of the other features of the present disclosure. For example, although FIG. 11 shows sharp angles, the abrasive powder 45 is also compatible with curves such as is shown in FIG. 12. The abrasive powder 45 is configured to enhance the cutting efficiency of the pressure side edge 44. This helps to reduce the temperature of the fan blade 41 (which can rise due to contact between the tip of the fan blade 41 and the attrition liner 7).

Figure 13:
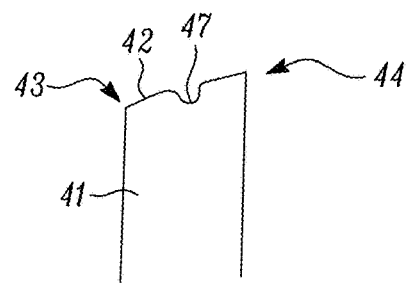

FIG. 13 is a mid-chord section view of a fan blade 41 according to the present disclosure. As shown in FIG. 13, in an arrangement the tip surface 42 comprises a groove 47. The groove 47 extends longitudinally along the length of the chord between the leading edge of the chord between the leading edge 48 and the trailing edge 49. The groove 47 may be included in the tip plane to encourage locally separating flow. The groove 47 can help to reduce flow leakage over the tip of the fan blade 41. This can help to increase the aerodynamic efficiency of the tip of the fan blade 41. The groove 47 is compatible with all of the other features of the present disclosure.

Figure 10:
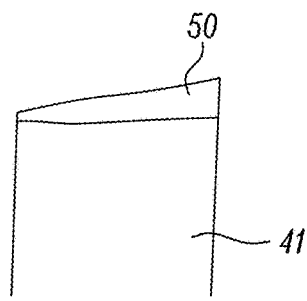
FIGS. 10 to 13 are mid-chord sectional views of alternative arrangements of a fan blade according to the present disclosure.

FIG. 10 is a mid-chord section view of a fan blade 41 according to the present disclosure. As shown in FIG. 10, in an arrangement the fan blade 41 comprises a tip cap 50. The tip cap 50 exhibits the chamfer and other features explained above (e.g. the chordal groove 47). The tip cap 50 has the appropriate shape for providing the advantages explained above. The tip cap is applied to the rest of the fan blade 41. In an arrangement, the tip cap 50 may be manufactured using an additive manufacturing technique.

The values of the chamfer angle θ are not particularly limited. As explained above, it is desirable for the chamfer angle θ to be as small as possible, while still providing the advantages by avoiding contact between the suction surface and the attrition layer 7. In an arrangement, the chamfer angle θ is at most ten degrees, optionally at most six degrees and optionally at most five degrees. In an arrangement, the chamfer angle θ is at least one degree and optionally at least two degrees. For example, in an arrangement, the chamfer angle θ varies between about one degree and about four degrees along the chord of the fan blade 41.

The depth of the groove 47 is not particularly limited. In an arrangement, the groove 47 may have a depth within the range of from about 2 mm to about 4 mm or to about 10 mm.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A fan blade comprising a tip surface configured in use to face an internal wall of a nacelle,
the tip surface having a suction side edge, a pressure side edge and a chamfer, having a chamfer angle, such that in use the suction side edge is further than the pressure side edge from the internal wall of the nacelle,
wherein the chamfer angle (θ) of the chamfer varies along the tip surface between a leading edge of the fan blade and a trailing edge of the fan blade, and
the rate of change of the chamfer angle (θ) with respect to chord position (X) increases as the curvature of the perimeter of the tip surface increases.

2. The fan blade of claim 1, wherein the rate of change of the chamfer angle (θ) with respect to chord position (X) is greater at the trailing edge and/or at the leading edge than at a middle portion between the trailing edge and the leading edge.

3. The fan blade of claim 1, further comprising a main body formed of a first material and at least one outer layer formed of a second material different from the first material, wherein the at least one outer layer is applied on at least the suction side of the fan blade.

4. The fan blade of claim 3, wherein:
the first material is a carbon fiber reinforced polymer; and/or
the second material is a metal.

5. The fan blade of claim 1, further comprising a main body formed of metal.

6. The fan blade according to claim 1, wherein the tip surface is curved in a plane perpendicular to the engine axis around which the fan blade rotates in use, such that in use a point of the tip surface nearer to the pressure side edge than the suction side edge and spaced from the pressure side edge is equally close as the pressure side edge to the internal wall of the nacelle.

7. The fan blade of claim 1, further comprising an abrasive powder applied to the tip surface in the region of the pressure side edge.

8. The fan blade of claim 1, wherein the tip surface comprises a groove extending longitudinally along the length of the chord between the leading edge and the trailing edge.

9. The fan blade of claim 1, wherein the chamfer angle is at most 10°.

10. The fan blade of claim 1, wherein the chamfer angle is between the tip surface and a tangent perpendicular to the radial direction (R),
wherein the radial direction is from the engine axis around which the fan blade rotates in use to the tip surface,
wherein the chamfer angle is in a plane perpendicular to the engine axis.

11. A fan for a gas turbine engine, the fan comprising a plurality of fan blades of claim 1.

12. The fan blade of claim 1, wherein the chamfer angle is at most 5°.

13. A tip cap for a fan blade, the tip cap comprising a tip surface configured in use to face an internal wall of a nacelle,
the tip surface having a suction side edge, a pressure side edge and a chamfer, having a chamfer angle, such that in use the suction side edge is further than the pressure side edge from the internal wall of the nacelle,
wherein the chamfer angle (θ) of the chamfer varies along the tip surface between a leading edge of the fan blade and a trailing edge of the fan blade, and
the rate of change of the chamfer angle (θ) with respect to chord position (X) increases as the curvature of the perimeter of the tip surface increases.

* * * * *